US008287171B2

United States Patent
Hsu et al.

(10) Patent No.: US 8,287,171 B2
(45) Date of Patent: Oct. 16, 2012

(54) LIGHT EMITTING DIODE DEVICE AND DISPLAY DEVICE

(75) Inventors: Chih-Hua Hsu, Taipei Hsien (TW); Jung-Shiung Liau, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 315 days.

(21) Appl. No.: 12/840,901

(22) Filed: Jul. 21, 2010

(65) Prior Publication Data

US 2011/0170314 A1     Jul. 14, 2011

(30) Foreign Application Priority Data

Jan. 14, 2010   (TW) ................................ 99100901 A

(51) Int. Cl.
*F21V 7/04* (2006.01)
(52) U.S. Cl. ........................................ 362/612; 362/613
(58) Field of Classification Search .......... 362/600–603, 362/611–613; 313/46
See application file for complete search history.

(56) References Cited

OTHER PUBLICATIONS

Taiwanese patent application 94118256, filed Jun. 2, 1994, (TW200643544) with partial translation.
Taiwanese patent application 97202435, filed Feb. 4, 1997, (M338435) with partial translation.
Taiwanese patent application 97218611, filed Oct. 17, 1997, (M351994) with partial translation.
Taiwanese patent application 98200722, filed Jan. 15, 1998, (M362512) with partial translation.

*Primary Examiner* — Anne Hines
(74) *Attorney, Agent, or Firm* — Christie, Parker & Hale, LLP

(57) ABSTRACT

A display device includes a housing, a panel unit disposed in the housing, a light emitting diode module disposed between the housing and the panel unit, and a heat conducting layer. The light emitting diode module includes a circuit board, and a plurality of light emitting diodes disposed on the circuit board. The circuit board includes a board body formed with a plurality of through holes, and a first conducting unit and a second conducting unit disposed on the board body. Each of the light emitting diodes has a bottom portion disposed in a respective one of the through holes, and is coupled between each conducting parts of the first and second conducting units. The heat conducting layer contacts the housing, contacting parts of the first and second conducting units, and the bottom portions of the light emitting diodes.

22 Claims, 8 Drawing Sheets

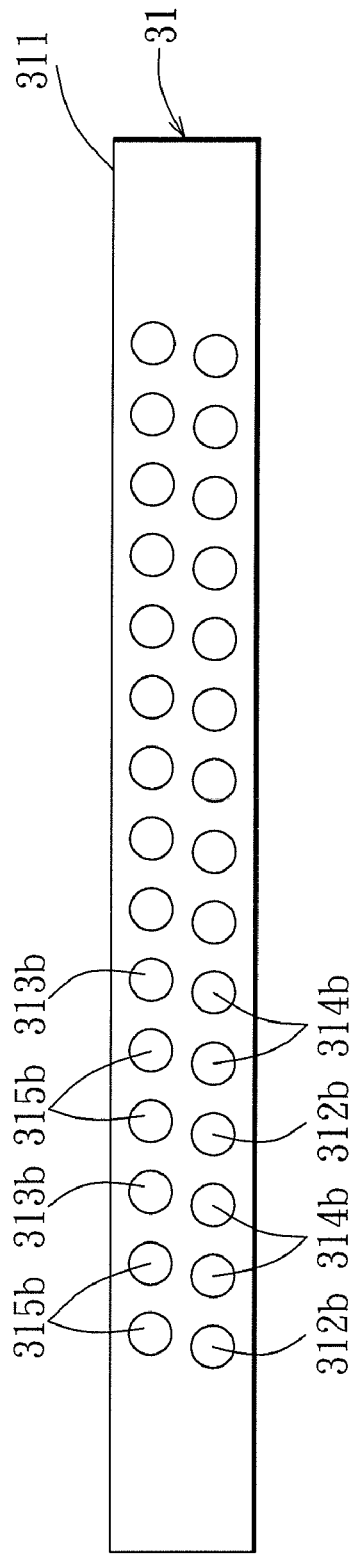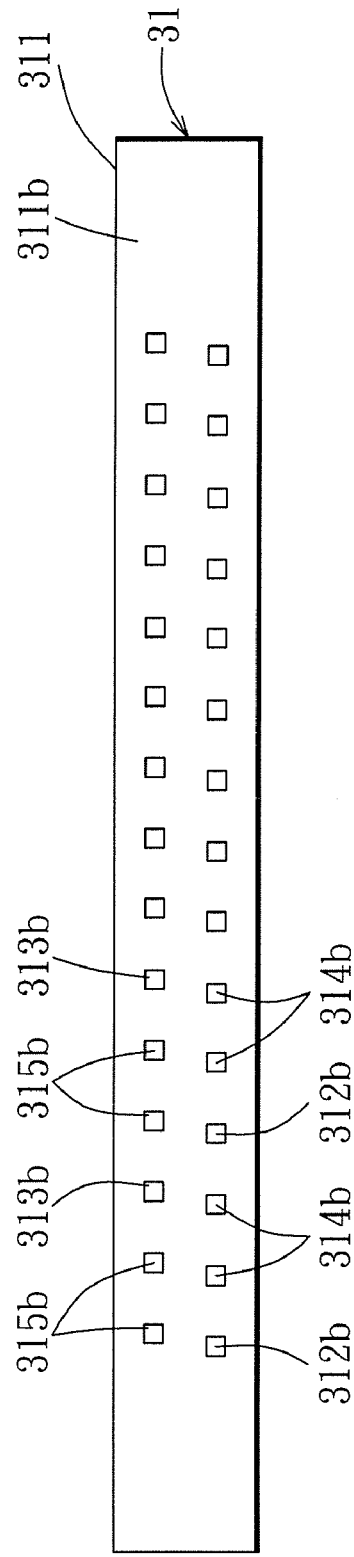

LIGHT EMITTING DIODE DEVICE AND DISPLAY DEVICE

CROSS-REFERENCE TO RELATED APPLICATION

This application claims priority of Taiwanese application no. 099100901, filed on Jan. 14, 2010.

BACKGROUND OF THE INVENTION

1. Field of the Invention

This invention relates to a light emitting diode device and a display device using the same, more particularly to a light emitting diode device capable of dissipating heat effectively and a display device using the same.

2. Description of the Related Art

Light emitting diodes (LED) are increasingly used for replacing light bulbs and fluorescent bulbs as a main light source due to their advantages of providing a high degree of illumination, having a long service life, and low power consumption. However, greater illumination efficiency of the LEDs accompanies greater thermal energy thus produced, and the LEDs also require relatively greater heat dissipation. Therefore, the heat dissipation problem is significant especially in the case of the high power LEDs.

SUMMARY OF THE INVENTION

An object of the present invention is to provide a light emitting diode device having a relatively greater efficiency of heat dissipation, and a display device using the light emitting diode device.

Accordingly, a display device of the present invention comprises a housing, a panel unit disposed in the housing, a light emitting diode module disposed between the housing and the panel unit, and a heat conducting layer. The light emitting diode module includes a circuit board, and a plurality of light emitting diodes disposed on the circuit board. The circuit board may be a flexible printed circuit board, and includes a flexible board body, and a first conducting unit and a second conducting unit that are disposed on the board body. The board body has a first board surface facing the panel unit, and a second board surface opposite to the first board surface and facing the housing. The board body is formed with a plurality of through holes extending from the first board surface to the second board surface. Each of the first and second conducting units includes a conducting part exposed from the first board surface and at least one contacting part exposed from the second board surface and coupled to the conducting part. The light emitting diodes have bottom portions disposed respectively in the through holes of the board body, and each of the light emitting diodes includes a light emitting die and a pair of conducting terminals. One end of each of the conducting terminals is electrically coupled to the light emitting die. Each of the light emitting diodes is coupled between the conducting part of the first conducting unit and the conducting part of the second conducting unit via another end of each of the conducting terminals. The heat conducting layer is composed of an insulating material, and is disposed between the second board surface and the housing. The heat conducting layer contacts the housing, the at least one contacting part of each of the first and second conducting units, and the bottom portions of the light emitting diodes.

According to another aspect, a light emitting diode device of the present invention comprises a heat dissipating seat, a light emitting diode module, and a heat conducting layer. The light emitting diode module is disposed on the heat dissipating seat, and includes a circuit board and a plurality of light emitting diodes disposed on the circuit board. The circuit board may be a flexible printed circuit board, and includes a flexible board body, and a first conducting unit and a second conducting unit that are disposed on the board body. The board body has a first board surface and a second board surface opposite to the first board surface and facing the heat dissipating seat. The board body is formed with a plurality of through holes extending from the first board surface to the second board surface. The board body is provided with the first and second conducting units, and each of the first and second conducting units includes a conducting part exposed from the first board surface and at least one contacting part exposed from the second board surface and coupled to the conducting part. The light emitting diodes have bottom portions disposed respectively in the through holes of the board body, and each of the light emitting diodes includes a light emitting die and a pair of conducting terminals. One end of each of the conducting terminals is electrically coupled to the light emitting die. Each of the light emitting diodes is coupled between the conducting part of the first conducting unit and the conducting part of the second conducting unit, via another end of each of the conducting terminals. The heat conducting layer is composed of an insulating material, and is disposed between the second board surface and the heat dissipating seat. The heat conducting layer contacts the heat dissipating seat, the at least one contacting part of each of the first conducting unit and the second conducting unit, and the bottom portions of the light emitting diodes.

The advantage of the present invention resides in that thermal energy generated by the light emitting die during operation may be conducted to the housing through the heat conducting layer due to the connection between a bottom portion of the light emitting diode and the heat conducting layer so as to dissipate the thermal energy to the outside. Further, by the connection between the conducting units and the heat conducting layer, the thermal energy may be also conducted to the housing through the conducting terminals, the conducting units, and the heat conducting layer, so as to dissipate the thermal energy to the outside.

BRIEF DESCRIPTION OF THE DRAWINGS

Other features and advantages of the present invention will become apparent in the following detailed description of the preferred embodiments with reference to the accompanying drawings, of which:

FIG. 4 is a plan view illustrating configuration of contacting parts exposed from a second board surface of a board body of a circuit board in the first preferred embodiment;

FIG. 5 is a plan view illustrating another configuration of the contacting parts exposed from the second board surface of the board body of the circuit board in the first preferred embodiment;

DETAILED DESCRIPTION OF THE PREFERRED EMBODIMENTS

Figure 1:
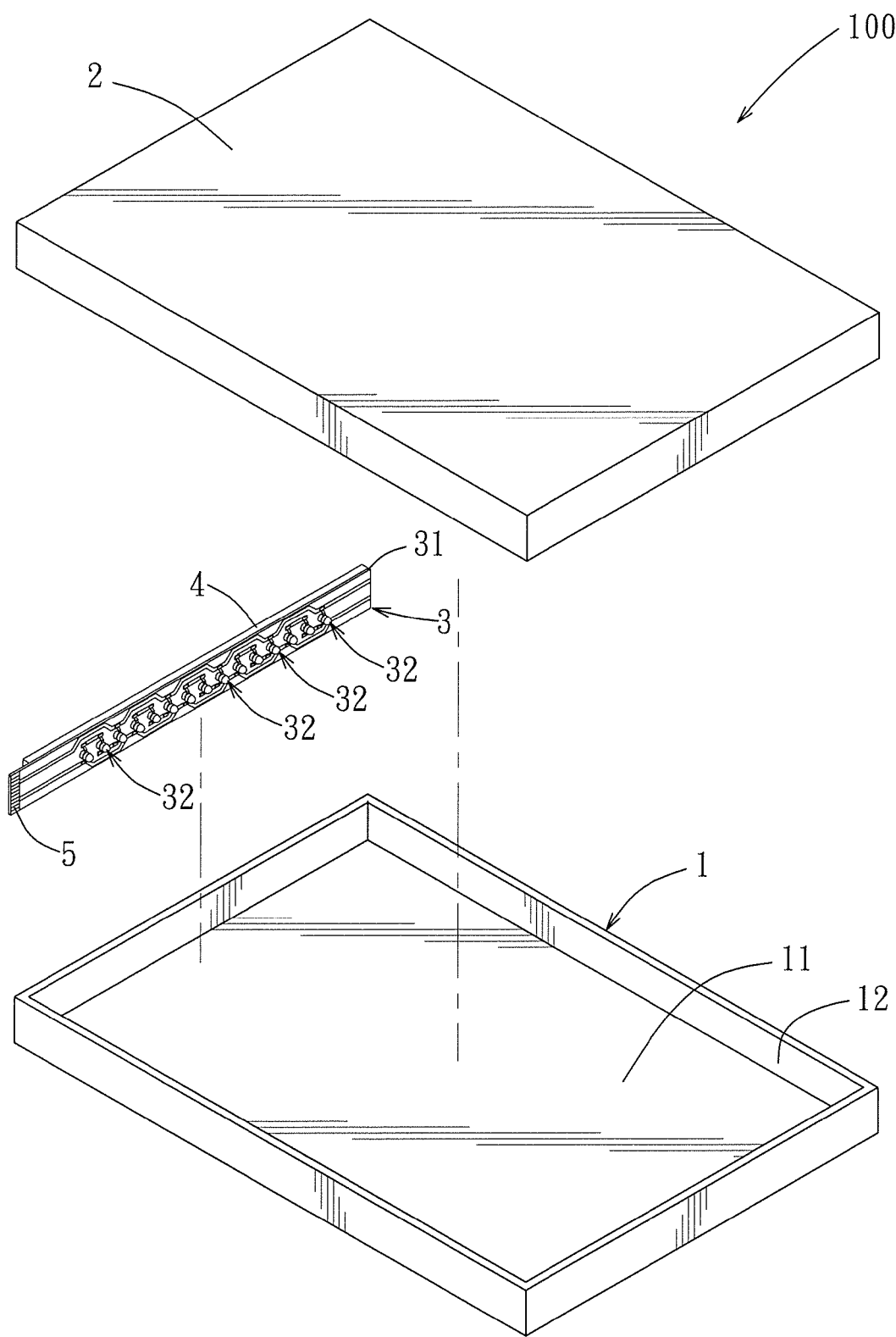
FIG. 1 is an exploded view of a first preferred embodiment of a display device according to the present invention.

Referring to FIG. 1, a first preferred embodiment of a display device 100 according to the present invention includes a housing 1, a panel unit 2 disposed in the housing 1, a light emitting diode module 3 disposed between the housing 1 and the panel unit 2, and a heat conducting layer 4 disposed between the light emitting diode module 3 and the housing 1. The light emitting diode module 3 serves as a backlight of the display device 100, and is a side lighting backlight in this embodiment.

In this embodiment, the housing 1 includes a back board 11, and a side wall 12 that is connected to an outer edge of the back board 11 and that surrounds the panel unit 2. The housing 1 is made of a metal material.

Figure 2:
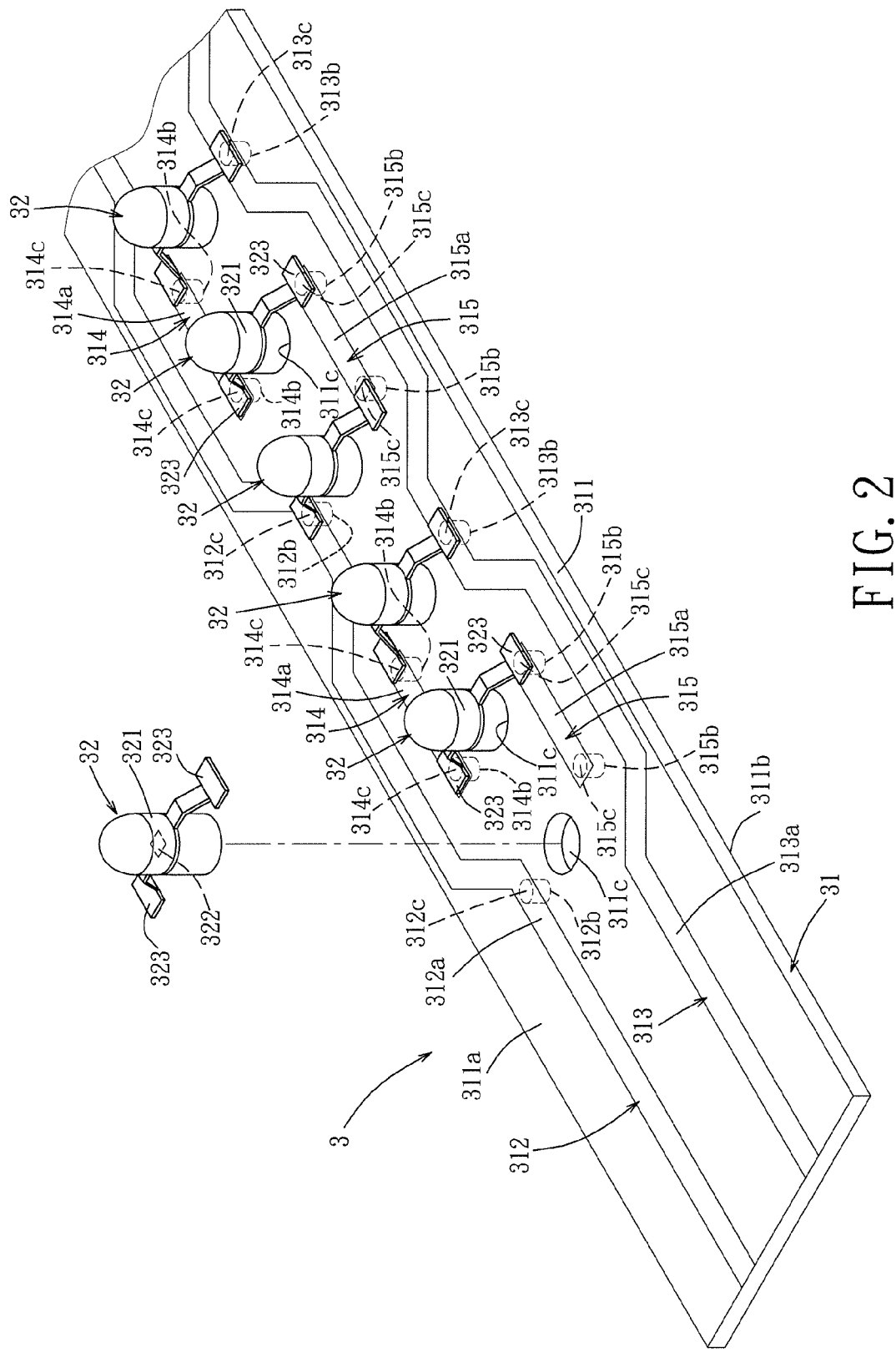
FIG. 2 is a fragmentary perspective view of a light emitting diode module of the display device of the first preferred embodiment.
Figure 3:
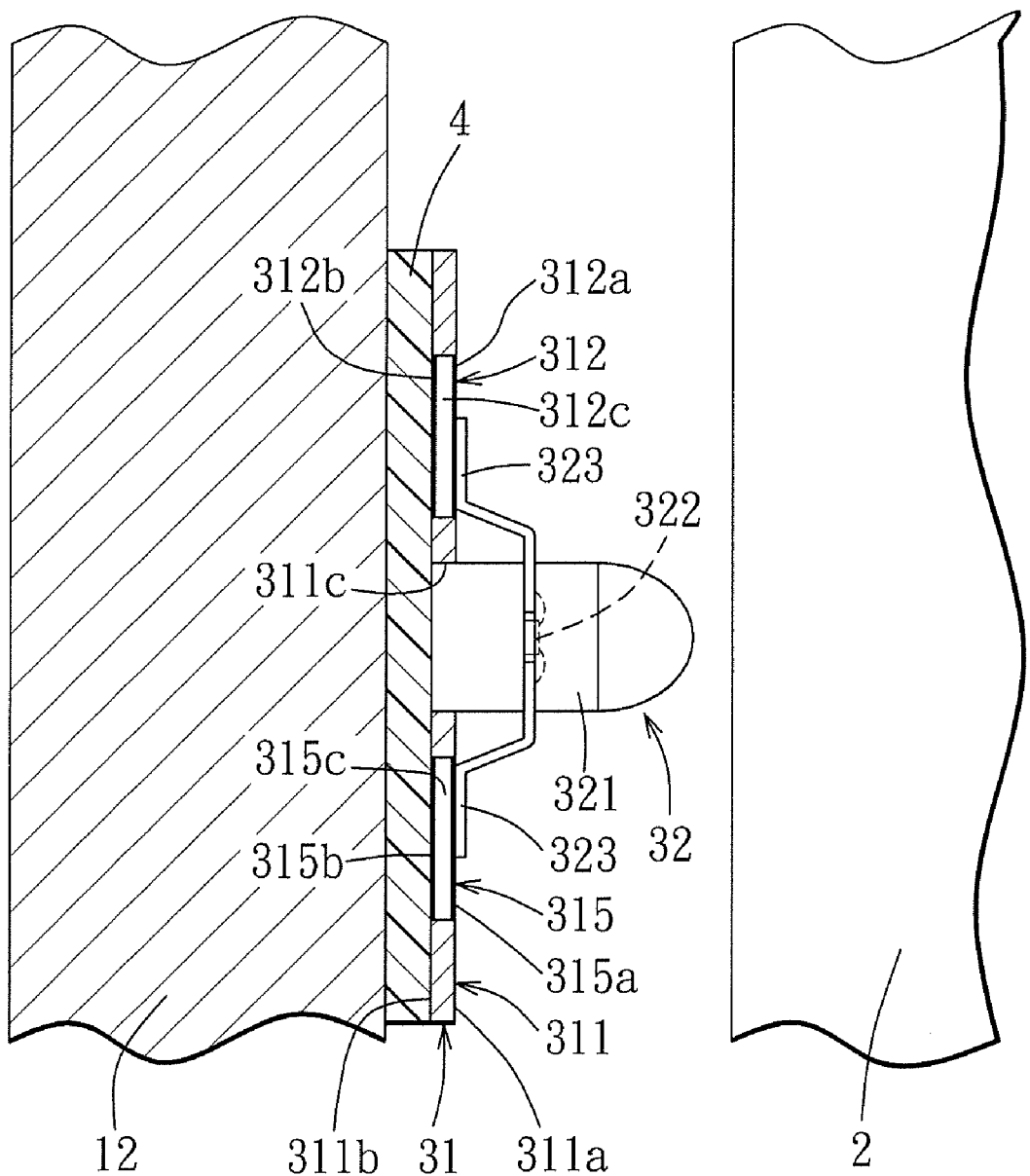
FIG. 3 is a partly sectional view of the display device of the first preferred embodiment.

Referring to FIGS. 1 to 3, the light emitting diode module 3 is disposed at an inner side of the side wall 12 of the housing 1 between the side wall 12 of the housing 1 and the panel unit 2. The light emitting diode module 3 includes a circuit board 31 and a plurality of light emitting diodes 32 disposed on the circuit board 31.

The circuit board 31 includes a flexible board body 311, a first conducting unit 312, a second conducting unit 313, a plurality of third conducting units 314, and a plurality of fourth conducting units 315. The conducting units 312-315 are disposed on the board body 311. The board body 311 has a first board surface 311a facing the panel unit 2, and a second board surface 311b opposite to the first board surface 311a and facing the side wall 12 of the housing 1, and is formed with a plurality of through holes 311c extending from the first board surface 311a to the second board surface 311b.

The first conducting unit 312 and the second conducting unit 313 are disposed longitudinally along the board body 311 at two sides of the through holes 311c, respectively. The first conducting unit 312 includes an elongated conducting part 312a exposed from the first board surface 311a of the board body 311, and a plurality of contacting parts 312b exposed from the second board surface 311b of the board body 311 and coupled to the conducting part 312a. The second conducting unit 313 includes an elongated conducting part 313a exposed from the first board surface 311a of the board body 311, and a plurality of contacting parts 313b exposed from the second board surface 311b of the board body 311 and coupled to the conducting part 313a.

Each of the third conducting units 314 and a corresponding one of the fourth conducting units 315 are disposed in a pair between the first conducting unit 312 and the second conducting unit 313 at two sides of the through holes 311c, respectively. Each of the third conducting units 314 includes a conducting part 314a exposed from the first board surface 311a of the board body 311, and a plurality of contacting parts 314b exposed from the second board surface 311b of the board body 311 and coupled to the conducting part 314a. Each of the fourth conducting units 315 includes a conducting part 315a exposed from the first board surface 311a of the board body 311, and a plurality of contacting parts 315b exposed from the second board surface 311b of the board body 311 and coupled to the conducting part 315a.

Taking a cross section of the configuration of the first conducting unit 312 and the fourth conducting unit 315 shown in FIG. 3 as an example, the circuit board 31 is a flexible printed circuit board (FPCB) in this embodiment. The FPCB includes a middle layer of an insulating material and a copper foil circuit disposed on each side surface of the middle layer, and an outer side surface of the copper foil circuits is coated with insulating material. Accordingly, in this embodiment, the board body 311 includes each of the layers of the above-mentioned materials, and the conducting parts 312a, 315a and the contacting parts 312b, 315b of the first and fourth conducting units 312, 315 are the portions of the copper foil circuits that are uncovered by and exposed from the insulating material. Each of the first and fourth conducting units 312, 315 further includes a plurality of middle coupling parts 312c, 315c coupled between the conducting parts 312a, 315a and the contacting parts 312b, 315b. The middle coupling parts 312c, 315c may be formed by filling copper posts or posts of other conductive materials, or disposing conductive cladding material into through holes formed in the meddle layer of the insulating material. Preferably, the middle coupling parts 312c, 315c are made of thermal-conducting material. Each of the contacting parts 312b, 315b of the first and fourth conducting units 312, 315 is disposed under a corresponding one of the middle coupling parts 313c, 314c. Similarly, in FIG. 2, each of the second and third conducting units 313, 314 also includes a plurality of middle coupling parts 313c, 314c coupled between the conducting parts 313a, 314a and the contacting parts 313b, 314b, and each of the contacting parts 313b, 314b of the second and third conducting units 313, 314 is disposed under a corresponding one of the middle coupling parts 313c, 314c.

Moreover, in this embodiment, a portion of the copper foil circuit at one end of the circuit board 31 is exposed and forms an insertion end 5 configured to be inserted into a power socket that is connected to an external power source. By using the FPCB as the circuit board 31 in this embodiment, the insertion end 5 at the circuit board 31 can be directly connected to the power socket and there is no requirement for soldering with a cable. Therefore, compared with the prior art that requires connection through a cable, the cable can be omitted in this embodiment. Further, the insertion end 5 can have flexibility.

Each of the light emitting diodes 32 includes a package body 321, a light emitting die 322 disposed within the package body 321, and a pair of conducting terminals 323. One end of each of the conducting terminals 323 extends into the package body 321 and is electrically coupled to the light emitting die 322, and another end thereof is welded to one of a corresponding pair of the conducting units 312-315. The package body 321 is exposed from the first board surface 311a of the board body 311, and a bottom portion of the package body 321 is disposed in one of the through holes 311c of the board body 311 and is exposed from the second board surface 311b of the board body 311. In this embodiment, the conductive terminals 323 are plate-shaped to thereby increase a contact area between each of the conductive terminals 323 and a corresponding one of the conducting parts 312a-315a.

In this embodiment, each pair of the third and fourth conducting units 314, 315 are configured to form a series connection among three adjacent ones of the light emitting diodes 32, and each set of the three adjacent ones of the light emitting diodes 32 in a series connection is coupled between the first and second conducting units 312, 313 such that the sets are coupled to one another in parallel. In each set of the three adjacent ones of the light emitting diodes 32 in a series connection, the conducting terminals 323 of one of the light emitting diodes 32 in the set are respectively connected to the first and fourth conducting units 312, 315, the conducting terminals 323 of a middle one of the light emitting diodes 32 in the set are respectively connected to the third and fourth conducting units 314, 315, and the conducting terminals 323 of the remaining light emitting diode 32 in the set are respectively connected to the second and third conducting units 313, 314.

In this embodiment, the heat conducting layer 4 is a heat conducting insulation adhesive disposed between the second board surface 311b of the circuit board 31 and the inner side of the side wall 12 of the housing 1, and the circuit board 31 is adhered to the inner side of the side wall 12 of the housing 1 by virtue of the heat conducting layer 4. In other words, the light emitting diode module 3 is adhered to the side wall 12 of the housing 1 by virtue of the heat conductive layer 4. The heat conductive layer 4 covers and directly contacts the contacting parts 312b, 313b, 314b, 315b of the conducting units 312-315 that are exposed from the second board surface 311b, and the bottom portions of the package bodies 321.

FIG. 3 illustrates one of the light emitting diodes 32 coupled between the first and fourth conducting units 312, 315 as an example. The ends of the conducting terminals 323 of the light emitting diode 32 are welded respectively to portions of the conducting parts 312a, 315a of the conducting units 312, 315 above the middle coupling parts 312c, 315c. Additionally, as described in the foregoing, the bottom portion of the package body 321 of the light emitting diode 32 directly contacts the heat conductive layer 4, and the contacting parts 312b, 315b of the conducting units 312, 315 are both connected to the conducting parts 312a, 315a and contact the heat conductive layer 4. Thus, when the light emitting die 322 operates, thermal energy thus generated can be conducted to the side wall 12 of the housing 1 through the heat conducting layer 4 due to the connection between the bottom portion of the package body 321 and the heat conducting layer 4 so as to dissipate the thermal energy to the outside. Besides, the thermal energy can be also conducted to the side wall 12 of the housing 1 through the conducting terminals 323, the conducting units 312, 315, and the heat conducting layer 4, so as to dissipate the thermal energy to the outside. Therefore, efficiency of heat dissipation of the light emitting diode 32 can be enhanced.

It should be noted that contours of the contacting parts 312b, 313b, 314b, 315b of the conducting units 312-315 that are exposed from the second board surface 311b of the board body 311 may be circular as shown in FIG. 4 or rectangular as shown in FIG. 5, such that the contacting parts 312b, 313b, 314b, 315b have relatively uniform heat conductivity when contacting the heat conducting layer 4. Moreover, since the contacting parts 312b, 313b, 314b, 315b conduct the thermal energy by direct contact with the heat conducting layer 4, larger areas of the contacting parts 312b, 313b, 314b, 315b result in greater effect of heat conduction.

Further, the above-mentioned heat conduction layer 4 may be a solid and resilient heat conducting pad, and a pair of side surfaces thereof may be adhered to the second board surface 311b and the inner side of the side wall 12 of the housing 1, respectively.

Figure 6:
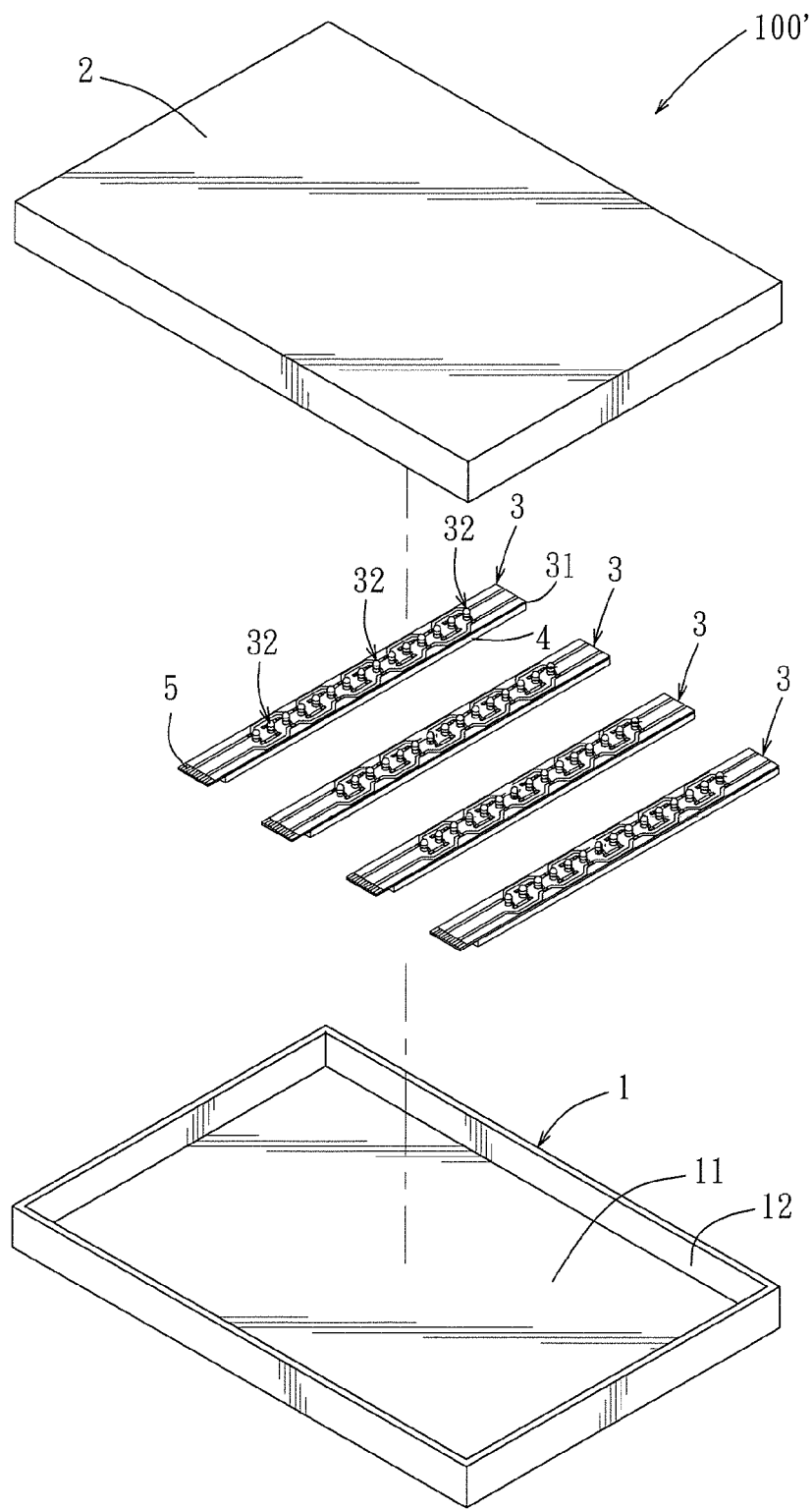
FIG. 6 is an exploded view of a second preferred embodiment of a display device according to the present invention.
Figure 7:
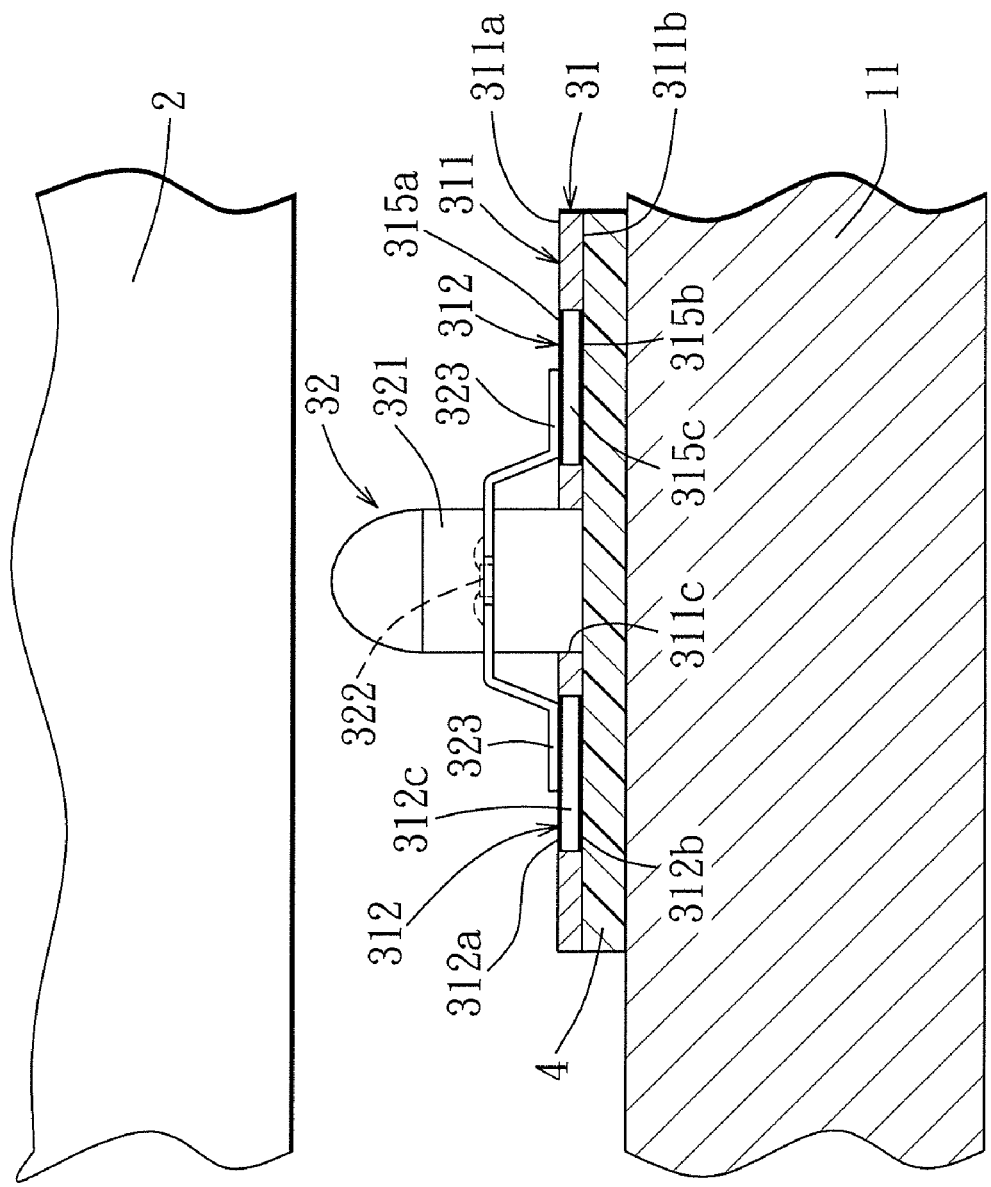
FIG. 7 is a partly sectional view of the display device of the second preferred embodiment.

Referring to FIGS. 6 and 7, a second preferred embodiment of a display device 100' of this invention is similar to the first preferred embodiment, and the difference therebetween is that the display device 100' includes a plurality of light emitting diode modules 3 serving as a direct backlight of the display device 100'. The light emitting diode modules 3 are disposed on the back board 11 of the housing 1 and between the back board 11 and the panel unit 2. In this embodiment, the heat conducting layer 4 is disposed between the second board surface 311b of the board body 311 and the back board 11 of the housing 1. FIG. 7 also illustrates one of the light emitting diodes 32 that is coupled between the first and fourth conducting units 312, 315 as an example. The conducting terminals 323 of the light emitting diode 32 are also coupled to the conducting parts 312a, 315a of the conducting units 312, 315, respectively. Similarly, the bottom portion of the package body 321 of the light emitting diode 32 and the contacting parts 312b, 315b of the conducting units 312, 315 directly contact the heat conductive layer 4.

Therefore, it can be appreciated from the foregoing that the light emitting diode module 3 is suitable for serving as the side lighting backlight or the direct backlight according to the present invention.

Figure 8:
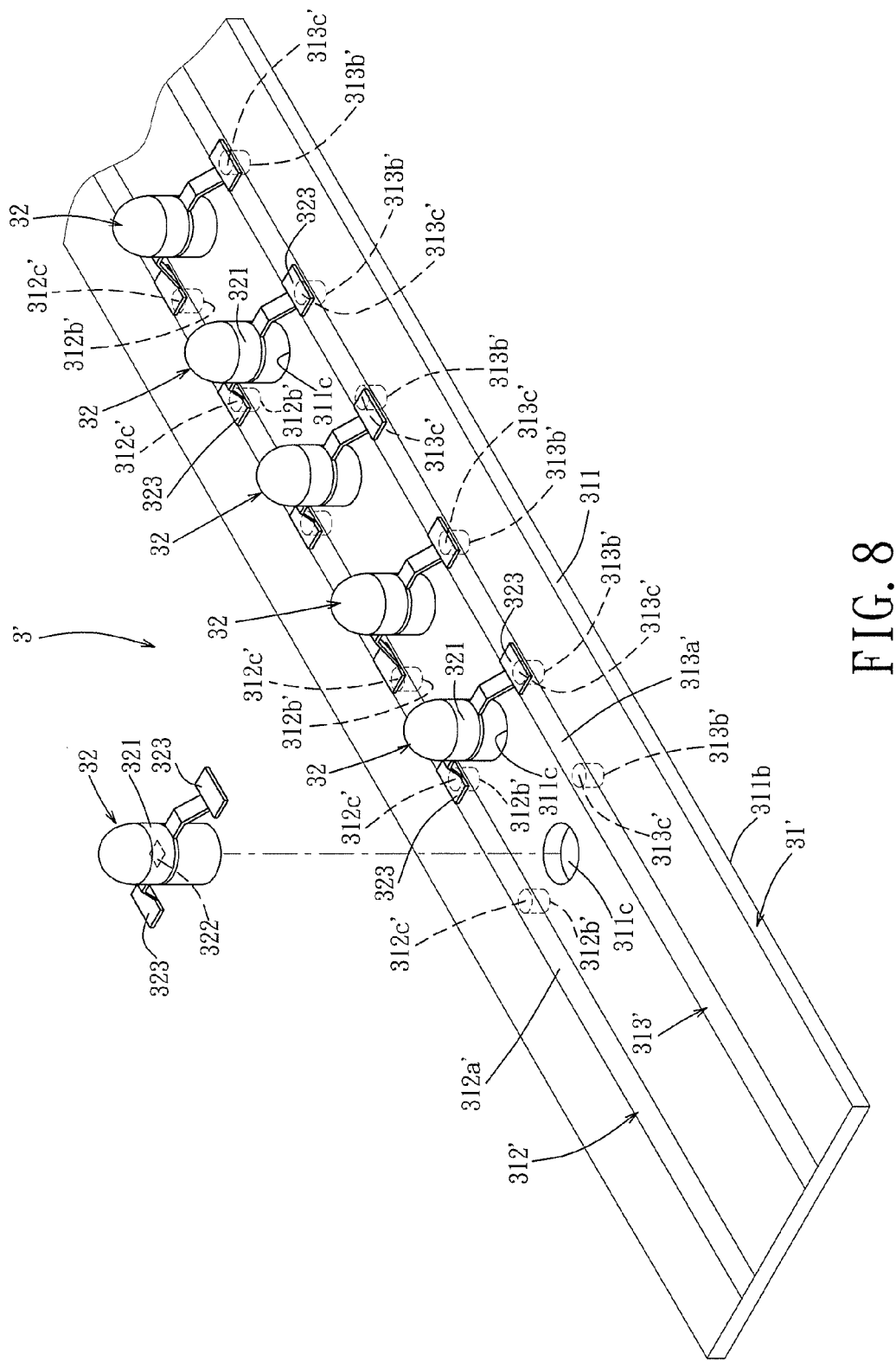
FIG. 8 is a fragmentary perspective view illustrating a modified configuration of a light emitting diode module of the display device.

Further, the light emitting diode module 3' can have a modified configuration shown in FIG. 8. In this modified configuration, the circuit board 31' includes only a first conducting unit 312' and a second conducting unit 313'. The first and second conducting units 312', 313' are similar to the above-mentioned first and second conducting units 312, 313, and respectively include conducting parts 312a', 313a', contacting parts 312b', 313b', and middle coupling parts 312c', 313c' coupled between the conducting parts 312a', 313a' and the contacting parts 312b', 313b'. Nevertheless, the conducting parts 312a', 313a' of the first and second conducting units 312', 313' extend longitudinally and are parallel with each other. A pair of conducting terminals 323 of each of the light emitting diodes 32 are welded respectively to the conducting parts 312a', 313a' of the first and second conducting units 312', 313', such that the light emitting diodes 32 are connected with each other in parallel through the first and second conducting units 312', 313'.

Figure 9:
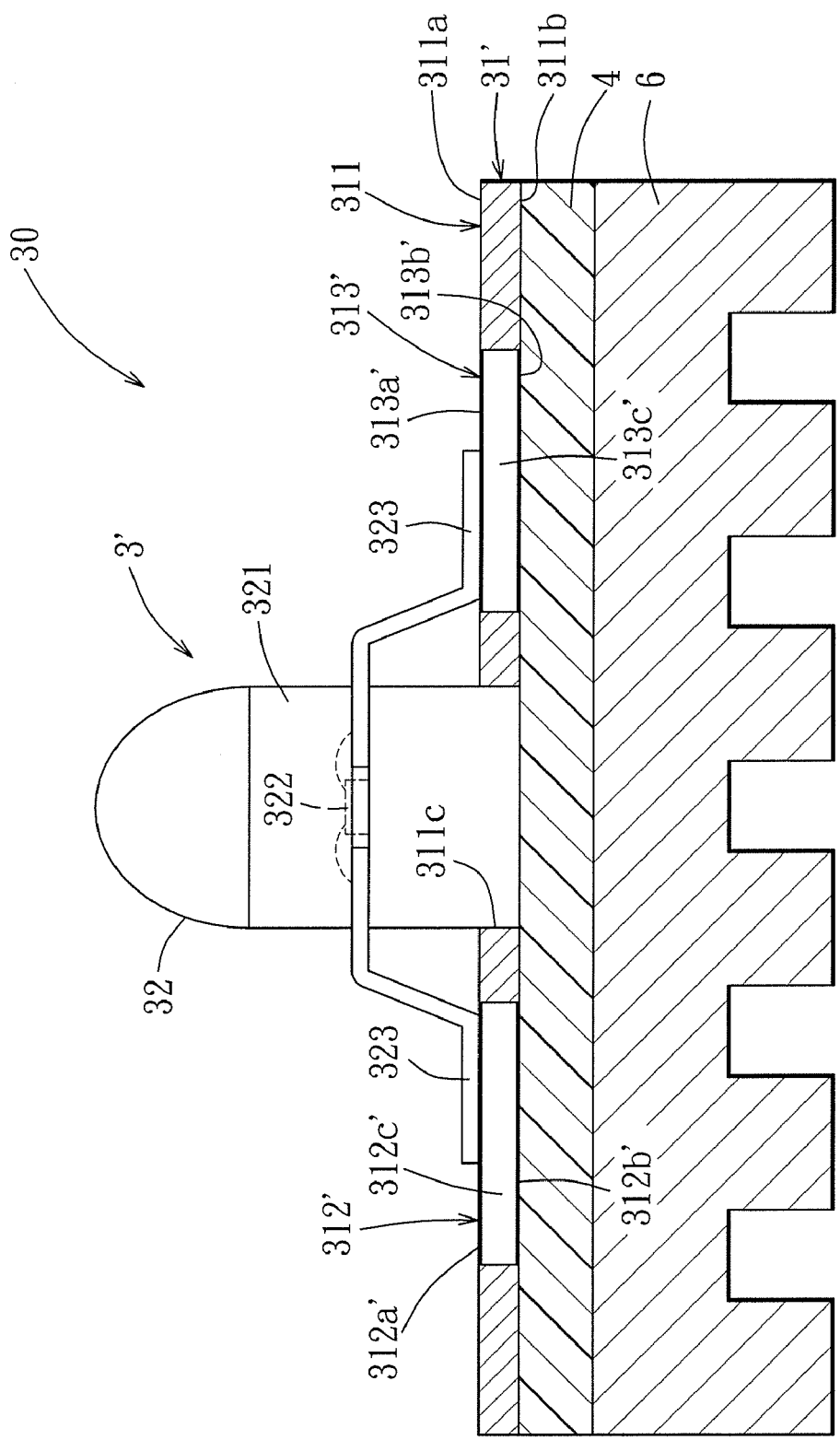
FIG. 9 is a sectional view illustrating a preferred embodiment of a light emitting diode device according to the present invention.

Moreover, an application of the light emitting diode module 3' used in a light emitting diode device 30 is shown in FIG. 9. The light emitting diode module 3' is adhered to a heat dissipating seat 6 (such as a metallic heat-dissipation fin sink) by the heat conducting layer 4 to constitute the light emitting diode device 30. Similarly, one side surface of the heat conducting layer 4 contacts the contacting parts 312b', 313b' of the first and second conducting units 312', 313', and the other side surface thereof is adhered to the heat dissipating seat 6. Certainly, the light emitting diode module 3' shown in FIG. 8 can be also applied in the aforesaid display device 100, 100'.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A display device comprising:
    a housing;
    a panel unit disposed in said housing;
    a light emitting diode module disposed between said housing and said panel unit, said light emitting diode module including
        a circuit board including a board body, a first conducting unit and a second conducting unit, said board body having a first board surface facing said panel unit and a second board surface opposite to said first board surface and facing said housing, said board body being formed with a plurality of through holes extending from said first board surface to said second board surface, said board body being provided with said first conducting unit and said second conducting unit, each of said first conducting unit and said second conducting unit including a conducting part exposed from said first board surface and at least one contacting part exposed from said second board surface and coupled to said conducting part, and a plurality of light emitting diodes having bottom portions disposed respectively in said through holes of said board body, each of said light emitting diodes including a light emitting die and a pair of conducting terminals, one end of each of said conducting terminals being electrically coupled to said light emitting die, each of said light emitting diodes being coupled between said conducting part of said first conducting unit and said conducting part of said second conducting unit via another end of each of said conducting terminals; and a heat conducting layer disposed between said second board surface and said housing, and contacting said housing, said at least one contacting part of each of said first conducting unit and said second conducting unit, and said bottom portions of said light emitting diodes.

2. The display device as claimed in claim 1, wherein each of said light emitting diodes further includes a package body, said light emitting die is disposed inside said package body, a bottom portion of said package body is disposed in one of said through holes of said board body and contacts said heat conducting layer, and said one end of each of said conducting terminals extends into said package body and is electrically coupled to said light emitting die.

3. The display device as claimed in claim 1, wherein each of said first conducting unit and said second conducting unit further includes a plurality of middle coupling parts disposed between said first board surface and said second board surface and coupled to said conducting part and said at least one contacting part, said middle coupling parts being composed of a heat conducting material, each of said another ends of said conducting terminals of each of said light emitting diodes being coupled to one of said conducting parts of said first conducting unit and said second conducting unit and corresponding to one of said middle coupling parts.

4. The display device as claimed in claim 3, wherein each of said first conducting unit and said second conducting unit includes a plurality of said contacting parts exposed from said second board surface, said contacting parts corresponding respectively to said middle coupling parts.

5. The display device as claimed in claim 4, wherein said circuit board is a flexible printed circuit board having copper foil circuits, and said conducting part and said contacting parts of each of said first conducting unit and said second conducting unit are formed from exposed portions of said copper foil circuits of said flexible printed circuit board.

6. The display device as claimed in claim 5, wherein an end of said copper foil circuits of said circuit board is exposed so as to form a flexible insertion end.

7. The display device as claimed in claim 1, wherein:
each of said first conducting unit and said second conducting unit further includes a plurality of middle coupling parts disposed between said first board surface and said second board surface and coupled to said conducting part and said at least one contacting part, said middle coupling parts being composed of a heat conducting material; and said circuit board further includes a plurality of third conducting units and a plurality of fourth conducting units disposed between said first conducting unit and said second conducting unit, each of said third conducting units and said fourth conducting units including a conducting part exposed from said first board surface, at least one contacting part exposed from said second board surface, and at least one middle coupling part disposed between said first board surface and said second board surface and coupled to said conducting part and said at least one contacting part of the respective one of said third conducting units and said fourth conducting units, said middle coupling parts of each said third conducting units and said fourth conducting units being composed of a heat conducting material;

wherein said conducting terminals of one of said light emitting diodes respectively contact said conducting part of said first conducting unit and said conducting part of said fourth conducting unit, said conducting terminals of another of said light emitting diodes respectively contact said conducting part of said third conducting unit and said conducting part of said fourth conducting unit, and said conducting terminals of still another of said light emitting diodes respectively contact said conducting part of said third conducting unit and said conducting part of said second conducting unit.

8. The display device as claimed in claim 1, wherein said housing includes a back board and a side wall that is connected to said back board, said light emitting diode module is disposed on said side wall between said side wall and said panel unit, and said heat conducting layer is disposed between said second board surface of said circuit board and said side wall of said housing.

9. The display device as claimed in claim 1, wherein said housing includes a back board and a side wall that is connected to said back board, said light emitting diode module is disposed on said back board between said back board and said panel unit, and said heat conducting layer is disposed between said second board surface of said circuit board and said back board of said housing.

10. A light emitting diode device comprising:
a heat dissipating seat;
a light emitting diode module disposed on said heat dissipating seat, said light emitting diode module including
a circuit board including a board body, a first conducting unit and a second conducting unit, said board body having a first board surface and a second board surface opposite to said first board surface and facing said heat dissipating seat, said board body being formed with a plurality of through holes extending from said first board surface to said second board surface, said board body being provided with said first conducting unit and said second conducting unit, each of said first conducting unit and said second conducting unit including a conducting part exposed from said first board surface and at least one contacting part exposed from said second board surface and coupled to said conducting part, and a plurality of light emitting diodes having bottom portions disposed respectively in said through holes of said board body, each of said light emitting diodes including a light emitting die and a pair of conducting terminals, one end of each of said conducting terminals being electrically coupled to said light emitting die, each of said light emitting diodes is coupled between said conducting part of said first conducting unit and said conducting part of said second conducting unit via another end of each of said conducting terminals; and a heat conducting layer composed of an insulating material and disposed between said second board surface and said heat dissipating seat, said heat conducting layer contacting said heat dissipating seat, said at least one contacting part of each of said first conducting unit and said second conducting unit, and said bottom portions of said light emitting diodes.

11. The light emitting diode device as claimed in claim 10, wherein each of said light emitting diodes further includes a package body, said light emitting die is disposed inside said package body, a bottom portion of said package body is disposed in one of said through holes of said board body and contacts said heat conducting layer, and said one end of each of said conducting terminals extends into said package body and is electrically coupled to said light emitting die.

12. The light emitting diode device as claimed in claim 10, wherein each of said first conducting unit and said second conducting unit further includes a plurality of middle coupling parts disposed between said first board surface and said second board surface and coupled to said conducting part and said at least one contacting part, said middle coupling parts being composed of a heat conducting material, each of said another ends of said conducting terminals of each of said light emitting diodes being coupled to one of said conducting parts of said first conducting unit and said second conducting unit and corresponding to one of said middle coupling parts.

13. The light emitting diode device as claimed in claim 12, wherein each of said first conducting unit and said second conducting unit includes a plurality of said contacting parts exposed from said second board surface, said contacting parts corresponding respectively to said middle coupling parts.

14. The light emitting diode device as claimed in claim 13, wherein said circuit board is a flexible printed circuit board having copper foil circuits, and said conducting part and said contacting parts of each of said first conducting unit and said second conducting unit are formed from exposed portions of said copper foil circuits of said flexible printed circuit board.

15. The light emitting diode device as claimed in claim 14, wherein an end of said copper foil circuits of said circuit board is exposed so as to form a flexible insertion end.

16. The light emitting diode device as claimed in claim 10, wherein:
each of said first conducting unit and said second conducting unit further includes a plurality of middle coupling parts disposed between said first board surface and said second board surface and coupled to said conducting part and said at least one contacting part, said middle coupling parts being composed of a heat conducting material; and
said circuit board further includes a plurality of third conducting units and a plurality of fourth conducting units disposed between said first conducting unit and said second conducting unit, each of said third conducting units and each of said fourth conducting units including a conducting part exposed from said first board surface, at least one contacting part exposed from said second board surface, and at least one middle coupling part disposed between said first board surface and said second board surface and coupled to said conducting part and said at least one contacting part of the respective one of said third conducting units and said fourth conducting units, said middle coupling parts of each of said third conducting units and said fourth conducting units being composed of a heat conducting material;
wherein said conducting terminals of one of said light emitting diodes respectively contact said conducting part of said first conducting unit and said conducting part of said fourth conducting unit, said conducting terminals of another of said light emitting diodes respectively contact said conducting part of said third conducting unit and said conducting part of said fourth conducting unit, and said conducting terminals of still another of said light emitting diodes respectively contact said conducting part of said third conducting unit and said conducting part of said second conducting unit.

17. A display device comprising:
a housing;
a panel unit disposed in said housing;
a light emitting diode module disposed between said housing and said panel unit, said light emitting diode module including
a circuit board including a board body and a plurality of conducting units, said board body having a first board surface and a second board surface, each of said conducting units including a conducting part exposed from said first board surface, at least one contacting part exposed from said second board surface, and at least one middle coupling part disposed between said first board surface and said second board surface and coupled to said conducting part and said at least one contacting part, and
a plurality of light emitting diodes having bottom portions exposed from said second board surface, each of said light emitting diodes including a light emitting die and a pair of conducting terminals, one end of each of said conducting terminals being electrically coupled to said light emitting die, and another end of each of said conducting terminals being coupled to a corresponding one of said conducting units; and
a heat conducting layer contacting said housing, said at least one contacting part of each of said conducting units and said bottom portions of said light emitting diodes.

18. The display device as claimed in claim 17, wherein said board body is formed with a plurality of through holes extending from said first board surface to said second board surface, and said bottom portions of said light emitting diodes are disposed respectively in said through holes.

19. The display device as claimed in claim 17, wherein said circuit board is a flexible printed circuit board having a copper foil circuit that is exposed so as to form a flexible insertion end.

20. A light emitting diode device comprising:
a heat dissipating seat;
a light emitting diode module disposed on said heat dissipating seat, said light emitting diode module including
a circuit board including a board body and plurality of conducting units, said board body having a first board surface and a second board surface, each of said conducting units including a conducting part exposed from said first board surface, at least one contacting part exposed from said second board surface, and at least one middle coupling part disposed between said first board surface and said second board surface and coupled to said conducting part and said at least one contacting part, and
a plurality of light emitting diodes having bottom portions exposed from said second board surface, each of said light emitting diodes including a light emitting die and a pair of conducting terminals, one end of each of said conducting terminals being electrically coupled to said light emitting die, and another end of each of said conducting terminals being coupled to a corresponding one of said conducting units; and
a heat conducting layer contacting said heat dissipating seat, said at least one contacting part of each of said conducting units and said bottom portions of said light emitting diodes.

21. The light emitting diode device as claimed in claim 20, wherein said board body is formed with a plurality of through holes extending from said first board surface to said second board surface, and said bottom portions of said light emitting diodes are disposed respectively in said through holes.

22. The light emitting diode device as claimed in claim 20, wherein said circuit board is a flexible printed circuit board having a copper foil circuit that is exposed so as to form a flexible insertion end.

* * * * *